2,816,105
METHOD OF PREPARING CELLULOSE ISOBUTYRATES

Carl J. Malm, Leo J. Tanghe, and Loring W. Blanchard, Jr., Rochester, N. Y., assignors to Eastman Kodak Company, Rochester, N. Y., a corporation of New Jersey No Drawing. Application January 26, 1956
Serial No. 561,639

4 Claims. (Cl. 260—227)

This invention relates to the making of cellulose isobutyrates which includes the addition of propionic anhydride in the final stages of the esterification procedure.

In the making of cellulose esters such as cellulose acetate, the cellulose usually after activation is esterified with acetic anhydride and sulfuric acid catalyst. In the case, however, of making cellulose isobutyrates the isobutyric anhydride employed as the esterifying agent is sufficiently sluggish that problems arise which are absent in esterification processes using more active esterifying agents. For instance, when cellulose is esterified with isobutyric anhydride using sulfuric acid catalyst, most of the sulfuric acid first combines with the cellulose and the isobutyric anhydride transesterifies this combined sulfuric acid only very slowly. As a consequence, considerable breakdown of the cellulose may take place before any substantial transesterification of the combined sulfuric acid by the isobutyric anhydride, and as a consequence, an ester of low viscosity results.

One object of our invention is to provide a method of preparing cellulose isobutyrates of other than low viscosity. Another object of our invention is to provide a process for preparing cellulose isobutyrates in which products of good uniformity are obtained. A further object of our invention is to provide a process for manufacturing cellulose isobutyrates in which propionic anhydride is supplied to the esterification mass near the end of the process. Other objects of our invention will appear herein.

We have found that if in the manufacture of cellulose isobutyrates in which cellulose is esterified with isobutyric anhydride and sulfuric acid catalyst, propionic anhydride is added to the esterification mixture when the cellulose fibers have disappeared that comparatively rapid transesterification of the combined sulfuric acid in the cellulose takes place, and a clear grain-free solution of cellulose ester of good viscosity is obtained. We have found that by this procedure the combined sulfur content of the product is considerably reduced.

Our invention comprises adding to the cellulose esterification mass, in which sulfuric acid catalyst and isobutyric anhydride esterification agent has been used and 80–90% of the acylation has occurred, at least 0.5 part of propionic anhydride per part of cellulose employed as the starting material and running the esterification to completion.

The cellulose employed as the starting material may be any one of the commonly employed celluloses of esterification-grade such as refined cotton linters or esterification-grade wood pulp. The cellulose is preferably first subjected to some sort of an activation such as soaking it in hot water or subjecting to a pull-through of aqueous acid followed by a dewatering with concentrated fatty acid. Instead of water, the cellulose might be activated by dilute aqueous alkali followed by washing or a very dilute mineral acid, it being preferable that the water be substantially removed from the cellulose before the esterification begins. The esterification of the cellulose is then commenced by mixing the activated cellulose with an esterification bath of isobutyric anhydride such as in a proportion of at least 4 parts of anhydride to one part of cellulose and sulfuric acid catalyst which may be present in any desired proportion such as 3–15% of sulfuric acid based on the weight of the cellulose. Often due to the sluggish nature of the isobutyric anhydride, it is desirable to supply some warming to the mass to promote the esterification action. After the cellulose has been 80–90% esterified, there is then added to the mass 0.5–2 parts of propionic anhydride per part of cellulose used for the starting material and the reaction is continued until the esterification is substantially completed and a product of good characteristics such as clarity, viscosity and the like is obtained. If a hydrolyzed product is desired aqueous acid such as dilute acetic acid may be added to impart a water content of 5–10% and the mass held at 100–110° F. for a sufficient time to impart the desired hydroxyl content. The ester prepared by our invention may be precipitated from the mass by means of dilute aqueous acid.

The following example illustrates the preparation of cellulose isobutyrates in accordance with our invention:

Example 4.3 pounds of cellulose was given a hot-water soaking, was then treated with 5% aqueous sulfuric acid and was dewatered with 4 changes of a mixture of equal parts of propionic acid and isobutyric acid, and the acid was partially removed from the cellulose so as to obtain a cellulose mass weighing 7.8 pounds and containing 39.6 grams of sulfuric acid. The acid-containing cellulose was placed in an esterification mixer together with 17 pounds of isobutyric anhydride. The mixer was operated while the jacket temperature thereof was gradually raised from 60 to 100° F. over a 6 hour interval. Portions of the reaction mixture were removed at the times indicated below and propionic anhydride was added in the amount of 1 part for 5 parts of esterification mass, the main part of the batch having been reacted for 7 hours without any addition of propionic anhydride. The results obtained were as follows:

| Time of Addition of Extra Pr₂O | Total Hours Reaction at Time of Sampling | Combined Percent Sulfur at the end of the reaction |
|---|---|---|
| None added | 3.5 | 0.338 |
| Do | 5.5 | .326 |
| Do | 7.0 | .303 |
| after 4.5 hours | 6.0 | .190 |
| after 5.0 hours | 6.5 | .208 |
| after 5.5 hours | 7.0 | .222 |

We claim:

1. A process for preparing cellulose isobutyrates which comprises reacting upon cellulose with an esterification mass containing isobutyric anhydride and sulfuric acid catalyst, until the cellulose is 80–90% esterified then adding to the esterification mass at least 0.5 part of propionic anhydride per part by weight of cellulose and continuing the esterification.

2. A process for preparing cellulose isobutyrates which comprises reacting upon cellulose with an esterification mass containing isobutyric anhydride and sulfuric acid catalyst, until the latter is 80–90% esterified then adding to the mass at least 0.5–2 parts of propionic anhydride per part by weight of cellulose and continuing the esterification.

3. A process for preparing a cellulose isobutyrate which comprises reacting upon cellulose with isobutyric anhydride and sulfuric acid catalyst for six hours in which process after a time of 4½ hours has elapsed adding to the mass 0.5–2 parts of propionic anhydride per part by weight of original cellulose.

4. A process for preparing a cellulose isobutyrate which comprises esterifying cellulose with isobutyric anhydride and sulfuric acid catalyst for 6½ hours in which esterification at least 0.5 part of propionic anhydride per part by weight of the original cellulose is added at the end of 5 hours.

References Cited in the file of this patent

UNITED STATES PATENTS

| | | |
|---|---|---|
| 2,097,464 | Malm et al. | Nov. 2, 1937 |
| 2,490,754 | Hincke et al. | Dec. 6, 1949 |
| 2,622,080 | Richter et al. | Dec. 16, 1952 |